US012076782B2

(12) United States Patent
Schweizer et al.

(10) Patent No.: US 12,076,782 B2
(45) Date of Patent: Sep. 3, 2024

(54) MANUFACTURING OF A THREE-DIMENSIONAL WORKPIECE FROM A LIQUID MATERIAL

(71) Applicant: Robert Bosch GmbH, Stuttgart (DE)

(72) Inventors: Benjamin Schweizer, Horb (DE); Eberhard Maier, Koengen (DE); Peter Voehringer, Kornwestheim (DE); Roland Bleher, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 728 days.

(21) Appl. No.: 17/281,655

(22) PCT Filed: Sep. 27, 2019

(86) PCT No.: PCT/EP2019/076205
§ 371 (c)(1),
(2) Date: Mar. 31, 2021

(87) PCT Pub. No.: WO2020/070002
PCT Pub. Date: Apr. 9, 2020

(65) Prior Publication Data
US 2021/0387253 A1    Dec. 16, 2021

(30) Foreign Application Priority Data

Oct. 2, 2018  (DE) ..................... 10 2018 216 930.6

(51) Int. Cl.
*B22D 23/00*    (2006.01)
*B05B 1/08*    (2006.01)
(Continued)

(52) U.S. Cl.
CPC ............ *B22D 23/003* (2013.01); *B05B 1/083* (2013.01); *B22F 10/22* (2021.01); *B33Y 10/00* (2014.12); *B33Y 30/00* (2014.12); *B22F 12/53* (2021.01)

(58) Field of Classification Search
CPC ....... B22D 23/003; B05B 1/083; B22F 10/22; B22F 2999/00; B33Y 10/00; B33Y 30/00;
(Continued)

(56) References Cited

U.S. PATENT DOCUMENTS 5,598,200 A * 1/1997 Gore ..................... B22F 9/08
                                                     347/88
5,749,408 A * 5/1998 Gore ..................... B22D 23/00
                                                     164/94

(Continued)

FOREIGN PATENT DOCUMENTS

DE    102016224047 A1    6/2018
WO    2018167209 A1    9/2018

OTHER PUBLICATIONS

Translation of International Search Report for Application No. PCT/EP2019/076205 dated Dec. 3, 2019 (3 pages).

(Continued)

*Primary Examiner* — Jessee R Roe
*Assistant Examiner* — Michael Aboagye
(74) *Attorney, Agent, or Firm* — Michael Best & Friedrich LLP

(57) ABSTRACT

The invention relates to a method for the additive manufacturing of a three-dimensional workpiece from a liquid material (1), in which method the liquid material (1) is fed to a displacement chamber (2) and discharged in drop form via a jet hole (4) by means of a pressure pulse which is generated with the aid of a reciprocating piston (3) delimiting the displacement chamber (2). According to the invention, in order to optimise the wetting properties of at least one surface (5, 6) which delimits the displacement chamber (2) and/or the jet hole (4), sound waves are coupled into the liquid material (1) for a limited period of time with the aid of the piston (3) which is caused to vibrate for this purpose.

(Continued)

The invention also relates to a device for carrying out the method according to the invention.

16 Claims, 4 Drawing Sheets

(51) Int. Cl.
   *B22F 10/22* (2021.01)
   *B33Y 10/00* (2015.01)
   *B33Y 30/00* (2015.01)
   *B22F 12/53* (2021.01)

(58) Field of Classification Search
   CPC ......... B33Y 40/00; B33Y 50/00; Y02P 10/25; B29C 64/112; B29C 64/209
   USPC ........................................ 222/590, 594, 596
   See application file for complete search history.

(56) References Cited

U.S. PATENT DOCUMENTS

| | | | | |
|---|---|---|---|---|
| 5,846,496 | A | * 12/1998 | Bellet | ................... B08B 9/027 |
| | | | | 422/204 |
| 6,491,737 | B2 | * 12/2002 | Orme-Marmerelis | .... B22F 9/08 |
| | | | | 75/340 |
| 9,307,625 | B2 | * 4/2016 | Rollinger | ............... H05G 2/006 |
| 10,315,247 | B2 | * 6/2019 | Mark | ..................... B22F 10/22 |
| 2003/0205628 | A1 | * 11/2003 | Aizawa | ..................... B05B 1/02 |
| | | | | 239/82 |
| 2017/0173879 | A1 | 6/2017 | Myerberg et al. | |

OTHER PUBLICATIONS

Luo et al., "Impact-driven ejection of micro metal droplets on-demand", International Journal of Machine Tools & Manufacture, vol. 106, Apr. 2016, pp. 67-74.

* cited by examiner

MANUFACTURING OF A THREE-DIMENSIONAL WORKPIECE FROM A LIQUID MATERIAL

BACKGROUND OF THE INVENTION

The present invention relates to a method for the additive manufacturing of a three-dimensional workpiece from a liquid, in particular liquefied material.

The invention further relates to a device for carrying out the method. The invention further relates to a device for carrying out the method.

Included among the additive manufacturing methods is in particular 3D printing, in which liquid or solid materials are built up in layers to form a three-dimensional workpiece. In the present case, therefore, proposed in particular are a method and a device for 3D printing, wherein, however, exclusively liquid or liquefied materials should be used.

The laid-open patent application DE 10 2016 224 047 A1 discloses by way of example a printhead for a 3D printer, in particular a metal printer, which comprises a reservoir, formed in a housing, for receiving the metal. The reservoir comprises a melt region and a displacement chamber for the molten or liquefied metal, wherein the melt region and the displacement chamber are connected in such a way that the movement of a piston can induce the liquefied metal to pass through an exit opening. In the process, the liquefied metal is discharged in the form of droplets.

3D printing methods, which use printheads of the above-mentioned type, are also referred to as "drop-on-demand" methods. In this respect, the reproducibility of the droplet formation constitutes a particular challenge.

Liquid or liquefied metal has comparatively high surface tension. Moreover, if liquid metal comes into contact with a surface which is difficult to wet, for example is rough, the surface friction or adhesion is low. With respect to a liquid column of liquid metal, which forms within an exit opening of a printhead, this effect can lead to the velocity profile of the liquid column no longer being axially symmetrical and the droplets of liquid metal that form at the end of the exit opening being deflected in an uncontrolled manner.

SUMMARY OF THE INVENTION

The present invention is therefore based on the object of specifying a method for the additive manufacturing of a three-dimensional workpiece from a liquid, in particular liquefied material, which method makes the controlled discharge of droplets and thus a high reproducibility of the droplet formation possible.

This object is achieved by the method and the device of the invention. Advantageous refinements of the invention can be derived from the respective dependent claims.

In the proposed method for the additive manufacturing of a three-dimensional workpiece from a liquid material, the liquid material is fed to a displacement chamber and discharged in droplet form via a spray hole by means of a pressure pulse. Here, the pressure pulse is created using a piston which delimits the displacement chamber and can be moved back and forth. According to the invention, to optimize the wetting properties of at least one surface delimiting the displacement chamber and/or the spray hole, soundwaves are coupled into the liquid material in a time-restricted manner, specifically using the piston, which is set in vibration for this purpose.

The soundwaves press the liquid material into existing cavities in the surface, with the result that said cavities are filled with liquid material. As a result, the contact surface area between the liquid material and the surface is enlarged and the surface friction or adhesion rises. The problems mentioned in the introduction of the undesired deflection of droplets or the uncontrolled discharge of droplets when the liquid material exits the spray hole can be avoided or at least considerably alleviated in this way.

The advantages of the proposed method become particularly clearly evident when a liquid material with a high surface tension is used. Therefore, the proposed method is preferably used in the additive manufacturing of a three-dimensional workpiece of a liquid or liquefied metal. The liquid metal may be, for example, aluminum or an aluminum alloy.

The advantages also become particularly clearly evident when the at least one surface delimiting the displacement chamber and/or the spray hole is comparatively rough. This is the case in particular when the body forming the spray hole is manufactured from a porous ceramic. In that case, the body proves to be particularly liquid-repellent, in particular metallophobic and/or aluminophobic. The method according to the invention makes it possible to improve the wettability of the surface of the body.

It is advantageously the case that the wettability of the surface is improved merely in a locally restricted manner, specifically primarily in the region of the spray hole and/or in a region arranged upstream of the spray hole, in order to obtain an axially symmetrical tubular flow in this region or in these regions. A tubular flow with a parabolic velocity profile is preferably obtained. Downstream of the spray hole in the flow direction, by contrast, a low wettability of the surface has an advantageous effect, since said low wettability is conducive to a fast and reliable separation of the droplets. Surfaces which lie downstream of the spray hole in the flow direction therefore preferably have liquid-repelling, in particular metallophobic and/or aluminophobic properties. Since the soundwaves coupled in using the piston propagate merely in the displacement chamber and in the spray hole, in the method according to the invention it is also the case that only the surfaces which delimit the displacement chamber and/or the spray hole are modified in terms of their wettability.

The soundwaves are preferably coupled in prior to the creation of a pressure pulse for discharging the liquid material using the piston, for example during an initialization process prior to the start of the actual printing operation. It must merely be ensured that liquid material is present in the displacement chamber. The displacement chamber is preferably already completely filled with liquid material. The coupling in of the soundwaves during an initialization process ensures that the soundwaves do not impair the actual printing operation.

Further preferably, the soundwaves are coupled in over a period of time of $\leq 10$ s, preferably of $\leq 5$ s, further preferably of $\leq 1$ s. The coupling in of soundwaves thus leads to a scarcely noticeable delay in the actual printing operation, with the result that this method step has substantially no effects on the efficiency of the method.

In the process, the piston is preferably set in vibration at a frequency of >1 kHz, that is to say at a frequency which is too high for the actual printing operation. This ensures that the liquid material does not exit the spray hole prematurely and in an uncontrolled manner. This is because the spray hole is generally not closed by a closing element.

The piston is preferably set in vibration at a frequency of $\geq 4$ kHz, further preferably $\geq 20$ kHz, that is to say in high-frequency vibration. The high-frequency vibration of the piston makes it possible for soundwaves, in particular ultrasound waves, to be created which lead to existing cavities being completely filled with liquid material.

The piston is preferably set in vibration using an actuator, for example using a magnetostrictive, piezoceramic and/or magnetic actuator. This may in particular be an actuator which is used to move the piston back and forth in order to create the pressure pulse required for the discharge of the liquid material. In this way, an actuator can be dispensed with.

In one refinement of the invention it is proposed that, by coupling in soundwaves, gas bubbles are created in the liquid material. In that case, the gas bubbles can be made to implode in the region of the at least one surface delimiting the displacement chamber and/or the spray hole, with the result that the surface is smoothed by the imploding gas bubbles. That is to say that a leveling of an originally rough surface by cavitation erosion is induced in a targeted manner, wherein the leveling or smoothing leads to the desired enlargement of the contact surface area between the liquid material and the surface. Since not all cavities can be eliminated in this way, in addition to the cavitation erosion, the advantages of filling the cavities of the surface with liquid material are utilized. Since both effects can be achieved by coupling in soundwaves, both effects can be utilized at the same time.

The device proposed in addition for solving the object mentioned at the beginning comprises a displacement chamber, which can be filled with a liquid material and is delimited on one side by a piston which can be moved back and forth and on the other side by a ceramic body with a spray hole. In this respect, the ceramic body has at least one surface which delimits the displacement chamber and/or the spray hole and has a temporally modifiable wettability. The temporally modifiable wettability is achieved in that the device for carrying out the method according to the invention is used. This is because in that case, the effects and advantages described previously in connection with the method arise.

The proposed device is therefore preferably used to carry out the method according to the invention.

Since the spray hole is formed in a ceramic body, it is delimited by at least one surface which is comparatively rough. By coupling in soundwaves as per the method according to the invention, the wettability of the surface can be improved, with the result that a tubular flow with an axially symmetrical velocity profile prevails in the spray hole. That is to say that a deflection of the liquid column in a free jet, i.e. after the exit from the spray hole, is avoided. The fall line of the droplets forming in the process thus corresponds to the axis of the spray hole.

The spray hole of the device preferably has a diameter D of ≤500 µm, preferably of ≤300 µm, further preferably of ≤100 µm. The spray hole can accordingly also be referred to as a capillary. Forces arising in capillaries that could lead to the liquid material flowing out of the spray hole in an uncontrolled manner, however, do not arise, with the result that the spray hole does not need to be closed. The comparatively small diameter of the spray hole leads to small droplet diameters, which makes a very precise manufacture of a three-dimensional workpiece possible.

Further preferably, the piston is operatively connected to an actuator, for example a magnetostrictive, piezoceramic and/or magnetic actuator, with the result that the piston can be set in vibration and/or moved back and forth using the actuator. The same actuator is preferably used to induce vibration in the piston and to move the piston back and forth, with the result that an actuator can be dispensed with.

BRIEF DESCRIPTION OF THE DRAWINGS

The invention is explained in more detail below with reference to the appended drawings, in which.

DETAILED DESCRIPTION

Figure 1:
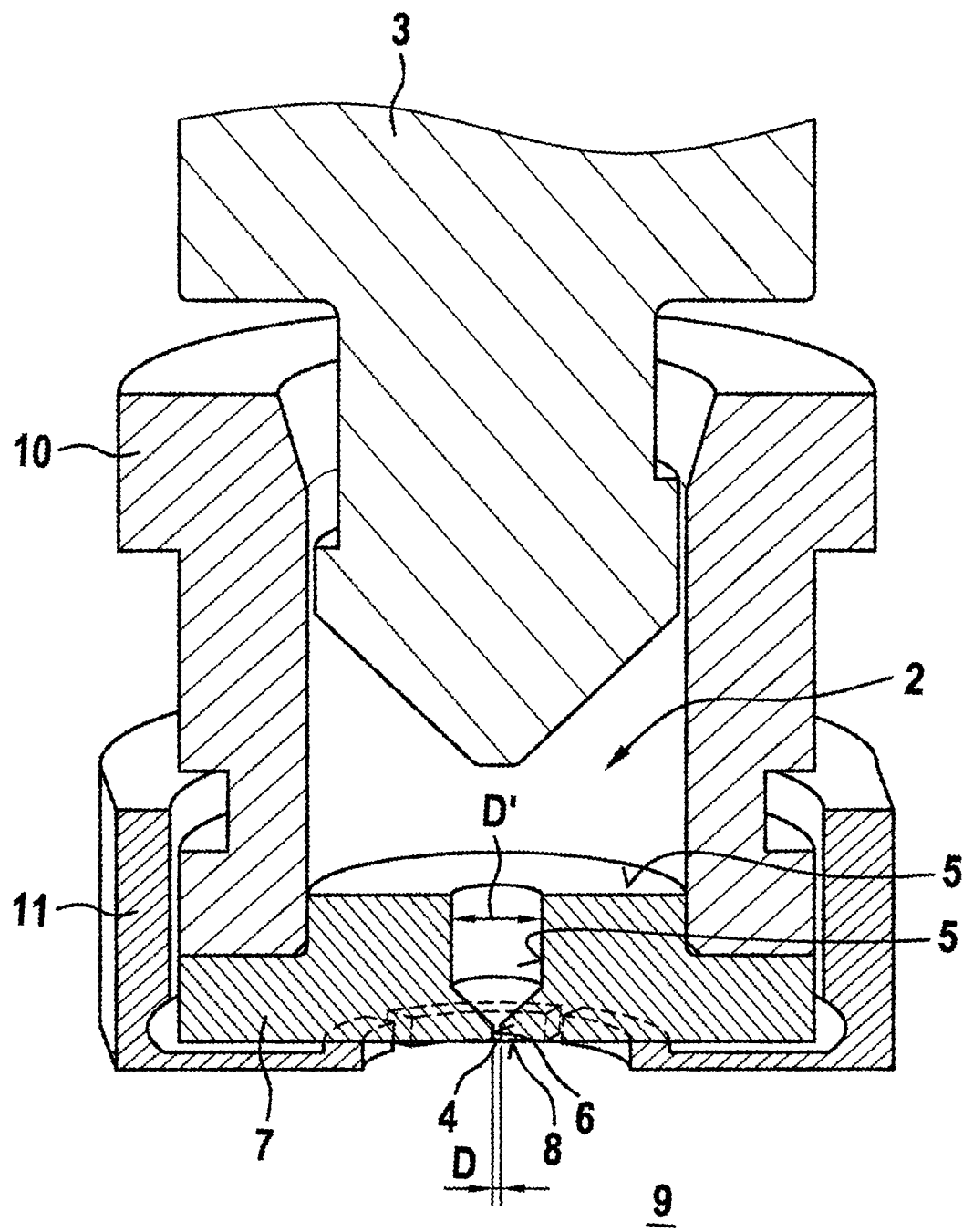
FIG. 1 shows a sectional view of a device according to the invention for the additive manufacturing of a three-dimensional workpiece from a liquid material.

What can be derived from FIG. 1 by way of example is a preferred embodiment of a device according to the invention for the additive manufacturing of a three-dimensional workpiece from a liquid, in particular liquefied material. The device is suitable in particular for carrying out the method according to the invention. The device illustrated is a 3D printer or a printhead of a 3D printer in the present case.

Constituent parts of the device are a housing 10 and a piston 3 which is received in the housing 10 such that it can move back and forth and delimits a displacement chamber 2 formed in the housing 10. The displacement chamber 2 is filled with a liquid material 1, in particular with a liquid or liquefied metal, for example with an aluminum melt, during operation of the device. The movements back and forth of the piston 3 make it possible to create pressure pulses which lead to the liquid material 1 being discharged via a spray hole 4. The spray hole 4 is formed in a ceramic body 7 which has a first surface 5 facing the displacement chamber 2 and a second surface 8 facing a substrate chamber 9. The spray hole 4 is delimited by a surface 6 of the ceramic body 7. The ceramic body 7, which has a plate-like form in the present case, is connected to the housing 10 via a clamping sleeve 11.

The spray hole 4 formed in the ceramic body 7 has a diameter D of smaller than 500 µm on the substrate-chamber side. That is to say that a considerable pressure pulse is required to press the liquid material 1 through the narrow spray hole 4. The pressure pulse is created using the piston 3, which is connected to an actuator (not illustrated) for this purpose.

When the liquid material 1 exits the spray hole 4, discrete droplets form, which separate at the surface 8 of the ceramic body 7 and move in freefall toward a workpiece carrier. The fall line in freefall corresponds here ideally to the longitudinal axis of the spray hole 4 in order to allow precise positioning of the droplets on the workpiece carrier. The three-dimensional workpiece to be manufactured is thus built up droplet by droplet on the workpiece carrier.

Figure 4:
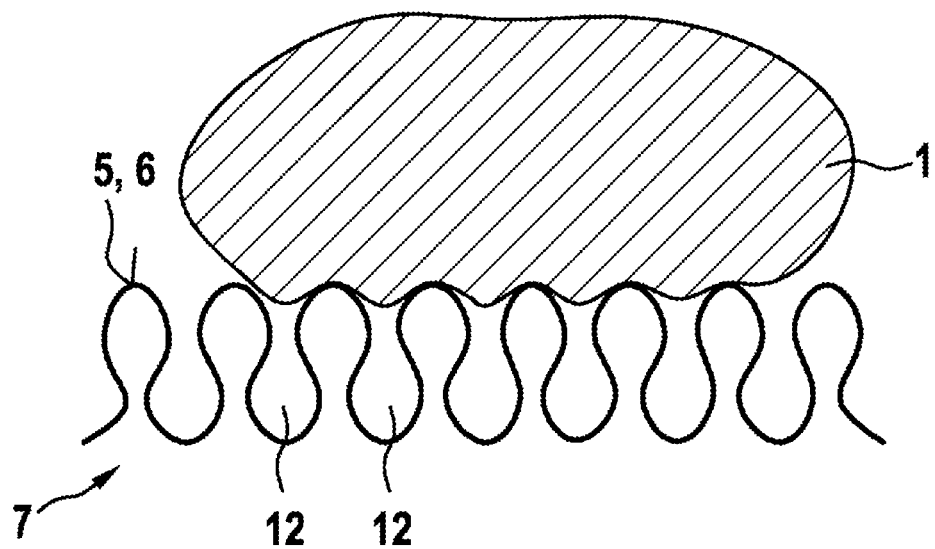
FIG. 4 shows an enlarged sectional illustration in the region of contact of the liquid material with the ceramic body forming the spray hole.

Since the ceramic body 7 is comparatively porous for manufacturing reasons, the surfaces 5, 6 and 8 have a low wettability in relation to the liquid material 1, with the result that the contact surface area between the liquid material 1 and the ceramic body 7 is not very large (see FIG. 4). In the case of the surface 8 facing the substrate chamber 9, this has proven to be an advantage since the low wettability is conducive to a fast and uniform separation of the droplets. In the case of the surfaces 5 and 6, the low wettability has proven to be a disadvantage, however, since at the same time the surface friction or adhesion of the liquid material 1 decreases at these surfaces 5, 6.

Figure 2:
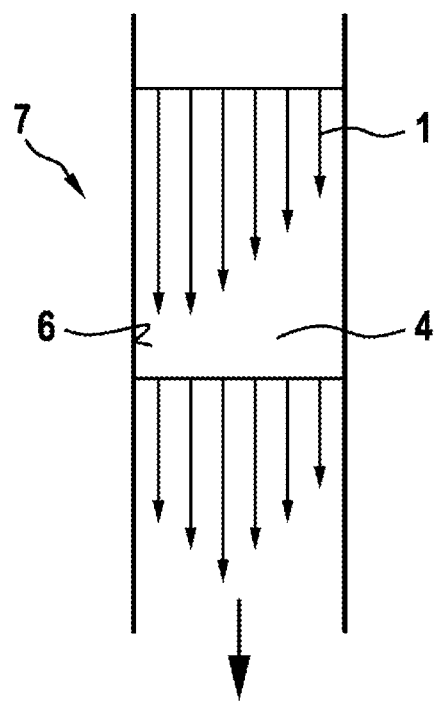
FIG. 2 shows a schematic longitudinal section through the spray hole of the device of FIG. 1.
Figure 3:
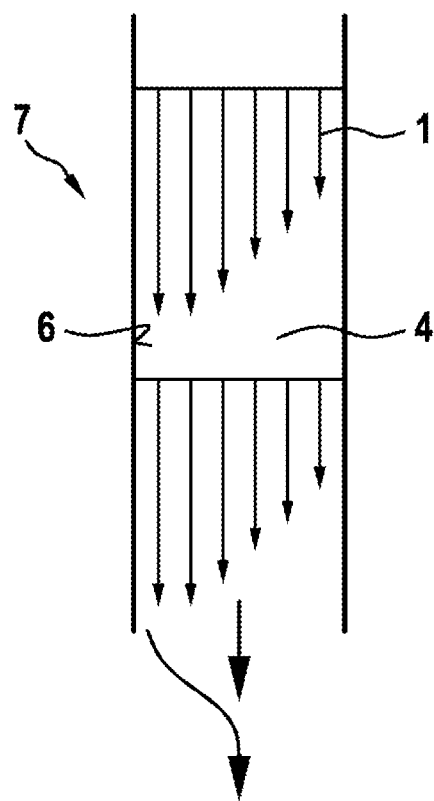
FIG. 3 shows a further schematic longitudinal section through the spray hole of the device of FIG. 1.

This can lead, as illustrated by way of example in FIGS. 2 and 3, to the velocity profile (indicated by arrows) of a liquid column of liquid material 1 located in the spray hole 4 not being axially symmetrical, with the result that the liquid column exiting the spray hole 4 and/or the droplets forming in that case are deflected (see FIG. 3). The freefall line of the droplets in that case no longer corresponds to the longitudinal axis of the spray hole 4, with the result that a precise placement of the droplets is no longer possible.

Figure 5:
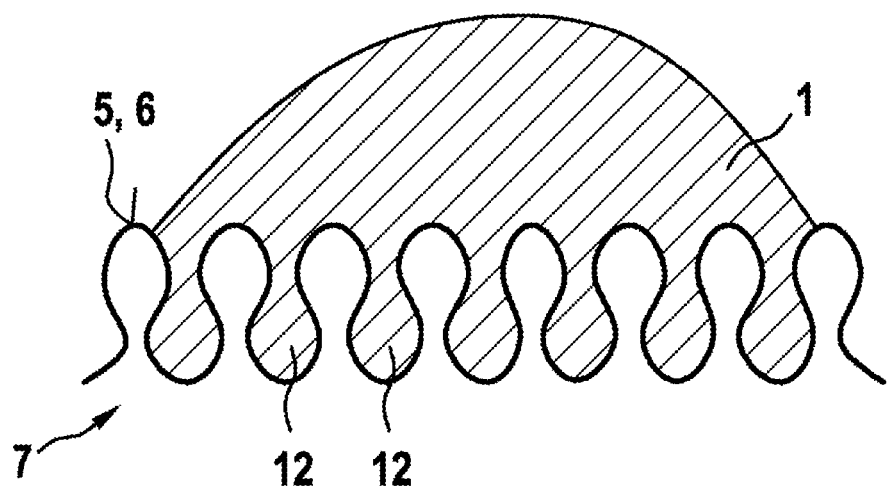
FIG. 5 shows a second enlarged sectional illustration in the region of contact of the liquid material with the ceramic body forming the spray hole.

In order to prevent this, in the proposed method, before the start of the actual manufacturing process an initialization is carried out, in which the piston 3 is induced into high-frequency vibrations for a short time using the actuator. The high-frequency vibrations have the effect that the liquid material 1 is pressed into cavities 12 of the surfaces 5, 6 of the ceramic body 7, with the result that said cavities fill completely with liquid material 1 (see FIG. 5). In this way, the contact surface area between the liquid material 1 and the ceramic body 7 is enlarged and the surface friction or adhesion of the liquid material 1 in the region of the spray hole 4 is thus increased, with the result that the risk of deflection of the droplets when they exit the spray hole 4 is considerably reduced.

Figure 6:
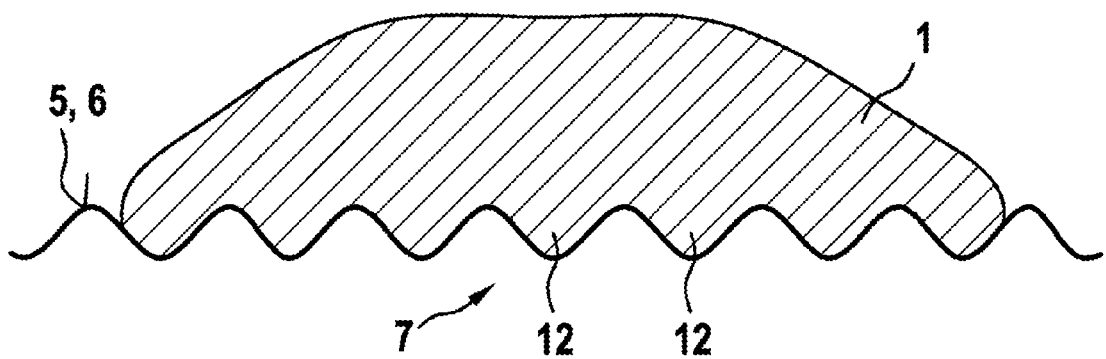
FIG. 6 shows a third enlarged sectional illustration in the region of contact of the liquid material with the ceramic body forming the spray hole.

Furthermore, the inducement into vibrations of the piston 3 makes it possible to create gas bubbles in the liquid material 1 that implode at the surfaces 5, 6 of the ceramic body 7 and, in the course of cavitation erosion, lead to a smoothing of the rough surfaces 5, 6 (see FIG. 6). This smoothing or leveling of the surfaces 5, 6 likewise contributes to an improvement in the wettability of the surfaces 5, 6.

In the present case, a region with an enlarged diameter D' is arranged upstream of the spray hole 4 of the device illustrated in FIG. 1, into which region the displacement chamber 2 extends. The region arranged upstream is accordingly delimited by a surface 5, the wettability of which is likewise improved by using the method according to the invention.

The invention claimed is:

1. A method for the additive manufacturing of a three-dimensional workpiece from a liquid material (1), the method comprising
    feeding the liquid material (1) to a displacement chamber (2),
    in an initialization process prior to a start of an actual printing operation, vibrating a piston (3) to couple ultrasonic soundwaves into the liquid material (1) to optimize wetting properties of at least one surface (5, 6) delimiting the displacement chamber (2) and/or a spray hole (4),
    after the initialization process, discharging the liquid material in droplet form via the spray hole (4) during the actual printing operation by a pressure pulse, which is created by moving the piston back and forth.
2. The method as claimed in claim 1,
    wherein the soundwaves are coupled into the liquid material over a period of time of ≤10 s.
3. The method as claimed in claim 1,
    wherein the piston (3) is vibrated at a frequency of >1 kHz.
4. The method as claimed in claim 1,
    wherein the piston (3) is vibrated and/or moved back and forth using an actuator.
5. The method as claimed in claim 1,
    wherein, by coupling in soundwaves, gas bubbles are created in the liquid material (1), the gas bubbles are made to implode in a region of the at least one surface (5, 6) delimiting the displacement chamber (2) and/or the spray hole (4), and the at least one surface (5, 6) is smoothed by the imploding gas bubbles.
6. A device for carrying out the method as claimed in claim 1, comprising a displacement chamber (2), which can be filled with a liquid material (1) and is delimited on one side by the piston (3) which is movable back and forth and on the another side by a ceramic body (7) has the at least one surface (5, 6) which delimits the displacement chamber (2) and/or the spray hole (4) and has a temporally modifiable wettability.
7. The device as claimed in claim 6,
    wherein the spray hole (4) has a diameter (D) of ≤500 μm.
8. The device as claimed in claim 6,
    wherein the piston (3) is operatively connected to an actuator, such that the piston (3) can be vibrated and/or moved back and forth using the actuator.
9. The device as claimed in claim 6,
    wherein the spray hole (4) has a diameter (D) of ≤300 μm.
10. The device as claimed in claim 6,
    wherein the spray hole (4) has a diameter (D) of ≤100 μm.
11. The device as claimed in claim 6,
    wherein the piston (3) is operatively connected to a magnetostrictive, piezoceramic and/or magnetic actuator, such that the piston (3) can be vibrated and/or moved back and forth using the actuator.
12. The method as claimed in claim 1,
    wherein the soundwaves are coupled into the liquid material over a period of time of ≤5 s.
13. The method as claimed in claim 1,
    wherein the soundwaves are coupled into the liquid material over a period of time of ≤1 s.
14. The method as claimed in claim 1,
    wherein the piston (3) is vibrated at a frequency of ≥4 kHz.
15. The method as claimed in claim 1,
    wherein the piston (3) is vibrated at a frequency of ≥20 kHz.
16. The method as claimed in claim 1,
    wherein the piston (3) is vibrated and/or moved back and forth using a magnetostrictive, piezoceramic and/or magnetic actuator.

* * * * *